(12) United States Patent
Oda et al.

(10) Patent No.: US 12,348,021 B2
(45) Date of Patent: Jul. 1, 2025

(54) ELECTRICAL JUNCTION BOX

(71) Applicant: Sumitomo Wiring Systems, Ltd., Yokkaichi (JP)

(72) Inventors: Maiko Oda, Yokkaichi (JP); Yusuke Okuhira, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 220 days.

(21) Appl. No.: 18/044,293

(22) PCT Filed: Aug. 30, 2021

(86) PCT No.: PCT/JP2021/031675
§ 371 (c)(1),
(2) Date: Mar. 7, 2023

(87) PCT Pub. No.: WO2022/054621
PCT Pub. Date: Mar. 17, 2022

(65) Prior Publication Data
US 2023/0327416 A1 Oct. 12, 2023

(30) Foreign Application Priority Data
Sep. 11, 2020 (JP) ................. 2020-152915

(51) Int. Cl.
*H02G 3/16* (2006.01)
*H02G 3/08* (2006.01)

(52) U.S. Cl.
CPC ............. *H02G 3/16* (2013.01); *H02G 3/081* (2013.01); *H02G 3/086* (2013.01)

(58) Field of Classification Search
CPC ............ H02G 3/16; H02G 3/08; H02G 3/081; H02G 3/86; H02G 3/14; H05K 5/00;
(Continued)

(56) References Cited

U.S. PATENT DOCUMENTS 6,870,096 B2 * 3/2005 Suzuki .................. H05K 7/026
174/59
9,203,223 B2 * 12/2015 Nakanishi ............. H02G 3/088
(Continued)

FOREIGN PATENT DOCUMENTS

EP 0828341 A2 3/1998
JP 2007-282385 A 10/2007
(Continued)

OTHER PUBLICATIONS

International Search Report, Application No. PCT/JP2021/031675, mailed Oct. 5, 2021. ISA/Japan Patent Office.

*Primary Examiner* — Angel R Estrada
(74) *Attorney, Agent, or Firm* — Honigman LLP (57) ABSTRACT

The configuration of an electrical junction box is simplified and made compact. Provided is an electrical junction box for a vehicle, including a housing that accommodates a high-voltage circuit for high voltages and a low-voltage circuit for low voltages, the electrical junction box including a connection portion for connection to the outside, the connection portion being provided on the housing, wherein the connection portion has both a high-voltage terminal connected to the high-voltage circuit and a low-voltage terminal connected to the low-voltage circuit.

6 Claims, 8 Drawing Sheets

(58) Field of Classification Search
CPC .......... H05K 5/02; B60R 16/00; B60R 16/02;
H01R 13/46
USPC .......... 174/50, 520, 559; 361/600, 601, 641,
361/648, 676, 679.01
See application file for complete search history.

(56) References Cited

U.S. PATENT DOCUMENTS

| | | | |
|---|---|---|---|
| 9,345,168 B2* | 5/2016 | Suzuki | H05K 1/0203 |
| 10,277,019 B2* | 4/2019 | Kosuga | H01R 13/748 |
| 10,292,281 B2* | 5/2019 | Saito | H01R 12/716 |
| 10,297,998 B2* | 5/2019 | Tsuchida | H01F 27/022 |

FOREIGN PATENT DOCUMENTS

| | | |
|---|---|---|
| JP | 2009-303463 A | 12/2009 |
| JP | 2015-015275 A | 1/2015 |
| JP | 2015-187963 A | 10/2015 |

* cited by examiner

ELECTRICAL JUNCTION BOX

CROSS-REFERENCE TO RELATED APPLICATIONS

This application is the U.S. national stage of PCT/JP2021/031675 filed on Aug. 30, 2021, which claims priority of Japanese Patent Application No. JP 2020-152915 filed on Sep. 11, 2020, the contents of which are incorporated herein.

TECHNICAL FIELD

The present disclosure relates to an electrical junction box for a vehicle.

BACKGROUND

Conventionally, electrical junction boxes for connecting a power supply to loads have become widespread. Such electrical junction boxes are connected to loads via an ECU (electronic control unit), for example.

JP 2007-282385A discloses an electrical junction box having a spring portion that biases an ECU mounted to the electrical junction box in a direction away from the electrical junction box, and thereby absorbing looseness between a connector portion of the ECU and a connector fitting portion of the electrical junction box that occurs when the connector portion is fitted to the connector fitting portion.

In recent years, there has been an increasing need for an electrical junction box having both a high-voltage circuit for high voltages exceeding 30 V and a low-voltage circuit for low voltages of 30 V or less. However, if a high-voltage terminal for connecting the high-voltage circuit to an external device such as an ECU and a low-voltage terminal for connecting the low-voltage circuit to another external device are located close to each other, there is a risk that leakage of current, that is, a so-called leak will occur between the high-voltage terminal and the low-voltage terminal. To prevent this problem, a connection portion having only a high-voltage terminal and a connection portion having only a low-voltage terminal are provided separately from each other.

On the other hand, if a connection portion having a high-voltage terminal and a connection portion having a low-voltage terminal are provided separately from each other as described above, there is a problem in that the configuration of the electrical junction box becomes complex, resulting in poor workability during the production process thereof and also making it difficult to realize a compact electrical junction box.

The electrical junction box of JP 2007-282385A, however, has only a low-voltage circuit and is not designed with consideration given to the case where it has both a high-voltage circuit and a low-voltage circuit, and therefore cannot solve the above-described problems.

Therefore, it is an object of the present disclosure to provide an electrical junction box that includes a connection portion having both a high-voltage terminal and a low-voltage terminal and the configuration of which can be simplified and made compact.

SUMMARY

An electrical junction box according to an embodiment of the present disclosure is an electrical junction box for a vehicle, including a housing that accommodates a high-voltage circuit for high voltages and a low-voltage circuit for low voltages, the electrical junction box including a connection portion for connection to an external device, the connection portion being provided on the housing, wherein the connection portion has both a high-voltage terminal connected to the high-voltage circuit and a low-voltage terminal connected to the low-voltage circuit.

According to the present disclosure, it is possible to provide an electrical junction box that includes a connection portion having both a high-voltage terminal and a low-voltage terminal and the configuration of which can be simplified and made compact.

DETAILED DESCRIPTION OF PREFERRED EMBODIMENTS

Description of Embodiments of Present Disclosure

First, embodiments of the present disclosure will be listed and described. At least some of the embodiments described below may be combined with each other as appropriate.

An electrical junction box according to an embodiment of the present disclosure is an electrical junction box for a vehicle, including a housing that accommodates a high-voltage circuit for high voltages and a low-voltage circuit for low voltages, the electrical junction box including a connection portion for connection to an external device, the connection portion being provided on the housing, wherein the connection portion has both a high-voltage terminal connected to the high-voltage circuit and a low-voltage terminal connected to the low-voltage circuit.

In this embodiment, a single connection portion has both a high-voltage terminal connected to the high-voltage circuit and a low-voltage terminal connected to the low-voltage circuit. Therefore, the housing can be made compact, compared with a case where a connection portion having only the high-voltage terminal and a connection portion having only the low-voltage terminal are provided separately from each other.

In the electrical junction box according to an embodiment of the present disclosure, the connection portion has a recessed engagement portion that is engageable with the external device, an end portion of the high-voltage terminal and an end portion of the low-voltage terminal are exposed to an outside via through holes formed in a bottom of the engagement portion, and a partition plate that obstructs a space between the end portion of the high-voltage terminal and the end portion of the low-voltage terminal is provided extending upright from the bottom.

In this embodiment, the end portion of the high-voltage terminal and the end portion of the low-voltage terminal are exposed to the outside via the through holes formed in the bottom of the engagement portion, and the partition plate that obstructs the space between the end portion of the high-voltage terminal and the end portion of the low-voltage terminal is provided extending upright from the bottom. Therefore, a sufficient creepage distance can be created between the end portion of the high-voltage terminal and the end portion of the low-voltage terminal, and the end portion of the high-voltage terminal and the end portion of the low-voltage terminal can be insulated from each other.

In the electrical junction box according to an embodiment of the present disclosure, a plurality of the partition plates are provided, and a distance between the plurality of partition plates is 1 mm or more.

In this embodiment, a plurality of partition plates that obstruct the space between the end portion of the high-voltage terminal and the end portion of the low-voltage terminal are provided extending upright from the bottom of the engagement portion while being spaced apart from each other by a distance of 1 mm or more. Therefore, a longer creepage distance can be created between the end portion of the high-voltage terminal and the end portion of the low-voltage terminal, and the end portion of the high-voltage terminal and the end portion of the low-voltage terminal can be more reliably insulated from each other.

In the electrical junction box according to an embodiment of the present disclosure, a fin is provided protruding from a surface of the partition plate that opposes the end portion of the high-voltage terminal or the end portion of the low-voltage terminal, and extends parallel to the bottom.

In this embodiment, the fin is provided protruding from the surface of the partition plate that opposes the end portion of the high-voltage terminal or the end portion of the low-voltage terminal. Therefore, a longer creepage distance can be created between the end portion of the high-voltage terminal and the end portion of the low-voltage terminal, and the end portion of the high-voltage terminal and the end portion of the low-voltage terminal can be more reliably insulated from each other.

In the electrical junction box according to an embodiment of the present disclosure, a plurality of the fins are provided, and a distance between the plurality of fins is 1 mm or more.

In this embodiment, the plurality of fins are provided protruding from the surface of the partition plate that opposes the end portion of the high-voltage terminal or the end portion of the low-voltage terminal. In addition, the distance between the fins is 1 mm or more. Therefore, a longer creepage distance can be created between the end portion of the high-voltage terminal and the end portion of the low-voltage terminal.

In the electrical junction box according to an embodiment of the present disclosure, the connection portion has a recessed engagement portion that is engageable with the external device, an end portion of the high-voltage terminal and an end portion of the low-voltage terminal are exposed to an outside via through holes formed in a bottom of the engagement portion, and a groove having a width of 1 mm or more is provided in the bottom, at a position between the end portion of the high-voltage terminal and the end portion of the low-voltage terminal.

In this embodiment, the groove having a width of 1 mm or more is provided in the bottom of the engagement portion, at a position between the end portion of the high-voltage terminal and the end portion of the low-voltage terminal. Therefore, a longer creepage distance can be created between the end portion of the high-voltage terminal and the end portion of the low-voltage terminal, and the end portion of the high-voltage terminal and the end portion of the low-voltage terminal can be more reliably insulated from each other.

Details of Embodiments of Present Disclosure

Hereinafter, the electrical junction box according to embodiments of the present disclosure will be described with reference to the drawings. Note that the present disclosure is not limited to these illustrative examples and is defined by the claims, and all changes that come within the meaning and range of equivalency of the claims are intended to be embraced therein.

Embodiment 1

Hereinafter, an electrical junction box for a vehicle according to an embodiment of the present disclosure will be described based on the drawings.

Figure 1:
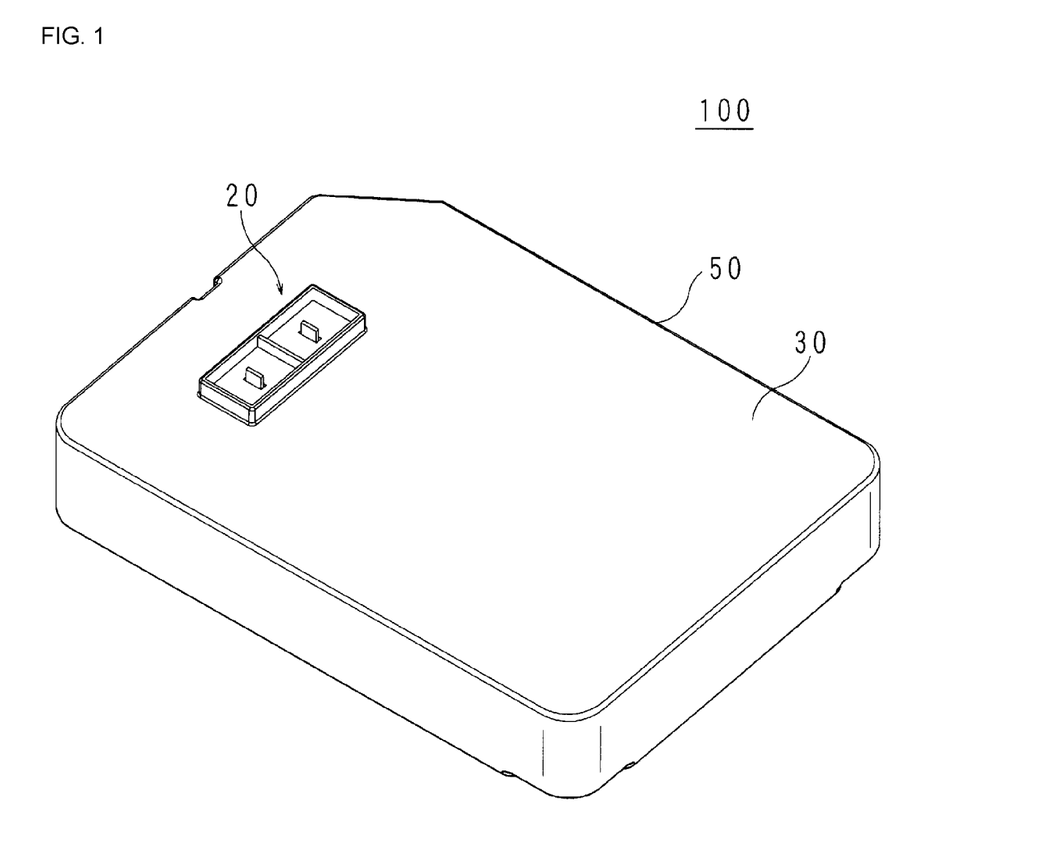
FIG. 1 is a perspective view of an electrical junction box according to Embodiment 1.

FIG. 1 is a perspective view of an electrical junction box 100 according to Embodiment 1.

The electrical junction box 100 supplies power from a power supply to various loads in a vehicle. The electrical junction box 100 includes a substantially parallelepiped-shaped housing 50, and the housing 50 is made of an insulating material such as a resin, for example. A connection portion 20 for connection to an external device such as an ECU is provided on a top plate 30 of the housing 50.

Figure 2:
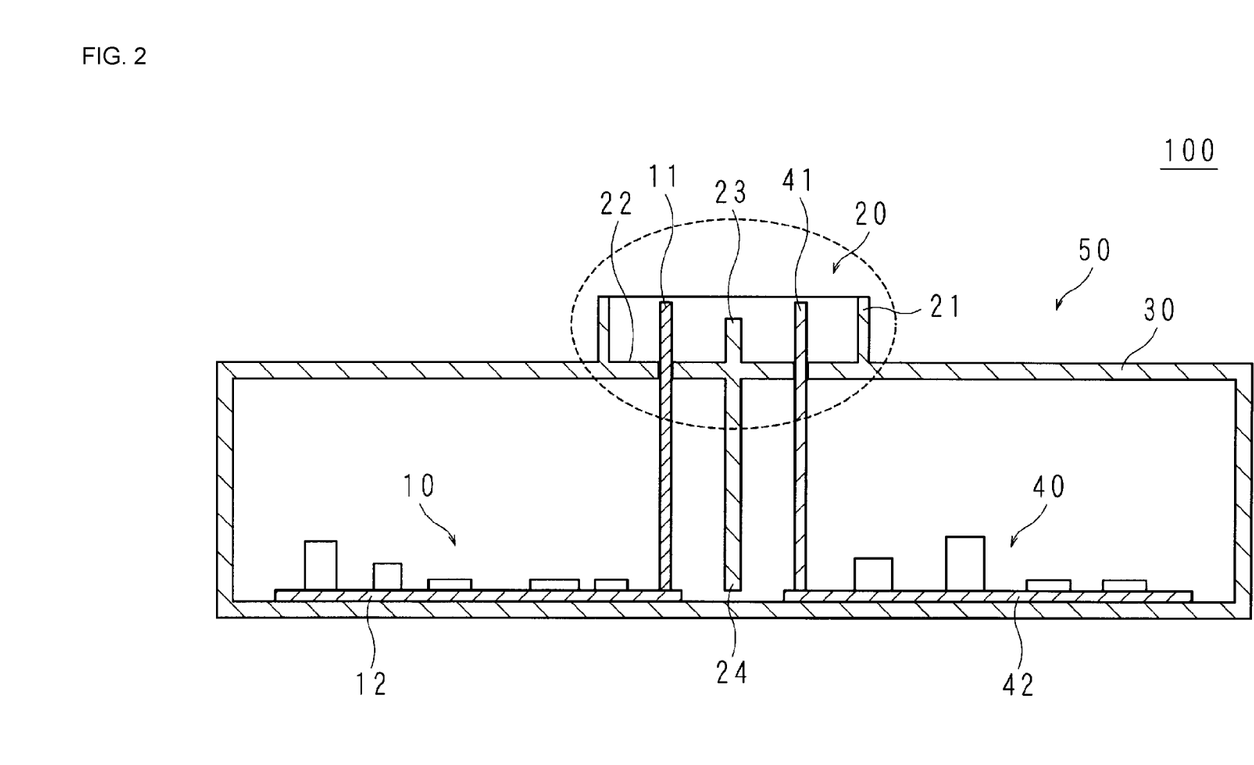
FIG. 2 is a cross-sectional view schematically showing an internal configuration of the electrical junction box.

FIG. 2 is a cross-sectional view schematically showing an internal configuration of the electrical junction box 100.

The housing 50 includes a high-voltage circuit 10 for high voltages exceeding 30 V and a low-voltage circuit 40 for low voltages of 30 V or less. For example, the high-voltage circuit 10 applies high voltage to loads such as an air conditioner, and the low-voltage circuit 40 applies low voltage to loads such as a relay and a ride.

The connection portion 20 has a recessed engagement portion 21 that is engageable with an external device. The engagement portion 21 has a rectangular shape in a horizontal cross-sectional view and is provided on an upper surface of the top plate 30. The engagement portion 21 is integrally formed with the housing 50 (top plate 30), for example. A high-voltage terminal 11 through which a high voltage current flows and a low-voltage terminal 41 through which a low voltage current flows are provided inside the engagement portion 21.

The high-voltage terminal 11 and the low-voltage terminal 41 are made of a conductive metal plate and have an elongated rectangular shape. The high-voltage terminal 11 is connected to a substrate 12 of the high-voltage circuit 10, and the low-voltage terminal 41 is connected to a substrate 42 of the low-voltage circuit 40.

Figure 3:
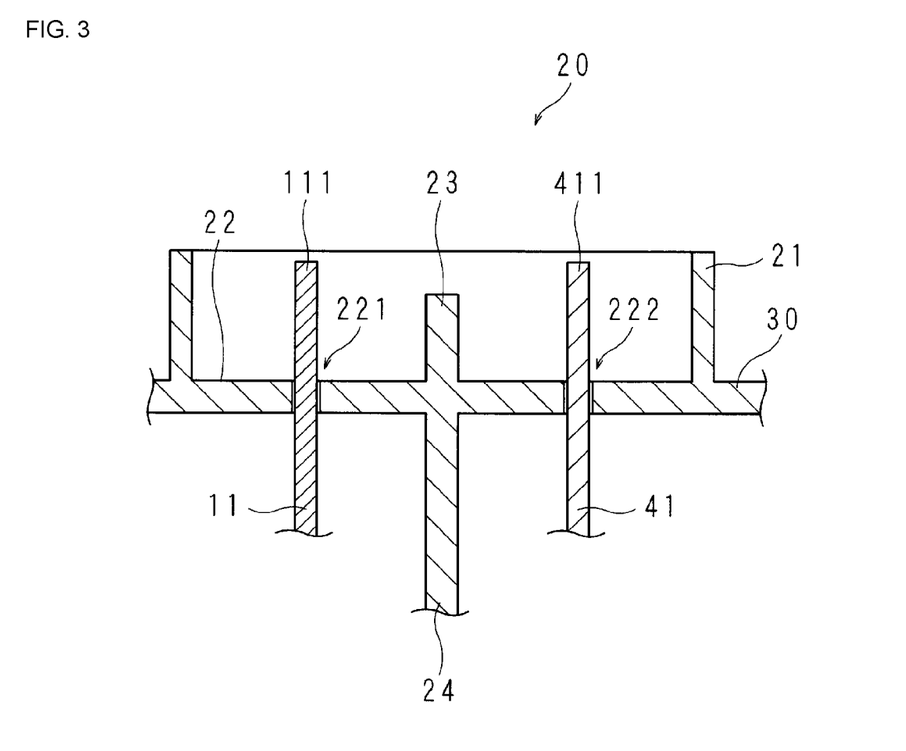
FIG. 3 is an enlarged view showing a portion of FIG. 2 in an enlarged manner.

FIG. 3 is an enlarged view showing a portion of FIG. 2 in an enlarged manner. FIG. 3 shows the portion enclosed by the dashed line in FIG. 2, in an enlarged manner.

Through holes 221 and 222 are formed in a bottom 22 of the engagement portion 21. The through hole 221 has a shape corresponding to the cross-sectional shape of the high-voltage terminal 11, and the through hole 222 has a shape corresponding to the cross-sectional shape of the low-voltage terminal 41. The through hole 221 and the through hole 222 are appropriately spaced apart from each other.

The high-voltage terminal 11 is inserted into the through hole 221 from the inside of the housing 50, and one end portion 111 of the high-voltage terminal 11 is exposed to the outside. The low-voltage terminal 41 is inserted into the through hole 222 from the inside of the housing 50, and one end portion 411 of the low-voltage terminal 41 is exposed to the outside. In this case, the end portion 111 of the high-voltage terminal 11 and the end portion 411 of the low-voltage terminal 41 oppose each other.

A partition plate 23 having a rectangular plate-like shape is provided extending upright from one surface of the bottom 22 of the engagement portion 21, at a position between the end portion 111 of the high-voltage terminal 11 and the end portion 411 of the low-voltage terminal 41. The partition plate 23 has insulating properties and is integrally formed with the housing 50. The partition plate 23 extends in a direction that crosses a direction in which the end portion 111 and the end portion 411 oppose each other, and obstructs the space between the end portion 111 and the end portion 411. With regard to the length (hereinafter referred to as "height") in a direction perpendicular to the bottom 22, the height of the partition plate 23 is slightly lower than the height of the end portion 111 and the end portion 411.

A partition wall 24 having a larger rectangular plate-like shape than the partition plate 23 is provided protruding from a surface of the bottom 22 that is opposite to the above-described one surface of the bottom 22, at a position corresponding to the partition plate 23. The partition wall 24 has insulating properties and extends in a thickness direction of the bottom 22. The partition wall 24 obstructs the space between the remaining portion of the high-voltage terminal 11, that is, the high-voltage terminal 11 excluding the end portion 111, and the remaining portion of the low-voltage terminal 41, that is, the low-voltage terminal 41 excluding the end portion 411. The height of the partition wall 24 is approximately equal to the height of the remaining portion of the high-voltage terminal 11 and the remaining portion of the low-voltage terminal 41.

If a high-voltage terminal and a low-voltage terminal are arranged close to each other, there is a risk that a so-called leak will occur. To prevent this problem, in general, a connection portion having only a high-voltage terminal and a connection portion having only a low-voltage terminal are provided separately from each other. However, in this case, the configuration of the electrical junction box becomes complex, resulting in poor workability during the production process thereof and also making it difficult to realize a compact electrical junction box.

In contrast, in the electrical junction box 100 of Embodiment 1, as described above, the high-voltage terminal 11 and the low-voltage terminal 41 are arranged spaced apart from each other, and the partition plate 23 and the partition wall 24 are provided between the high-voltage terminal 11 and the low-voltage terminal 41 and obstruct the space between the high-voltage terminal 11 and the low-voltage terminal 41.

Thus, a sufficient air clearance and a sufficient creepage distance can be created between the high-voltage terminal 11 and the low-voltage terminal 41, and insulation between the high-voltage terminal 11 and the low-voltage terminal 41 can be achieved. In other words, since the partition plate 23 and the partition wall 24 are provided between the high-voltage terminal 11 and the low-voltage terminal 41, the creepage distance between the high-voltage terminal 11 and the low-voltage terminal 41 is significantly increased. Accordingly, compared with a case where the partition plate 23 and the partition wall 24 are not provided, the high-voltage terminal 11 can be insulated from the low-voltage terminal 41 more reliably.

As a result of being configured as described above, the electrical junction box 100 of Embodiment 1 enables a single connection portion 20 to have both a high-voltage terminal 11 and a low-voltage terminal 41. Thus, the configuration of the electrical junction box 100 is simplified, and the electrical junction box 100 can be made compact.

Although the case where the height of the partition plate 23 is slightly lower than the height of the end portion 111 of the high-voltage terminal 11 and the end portion 411 of the low-voltage terminal 41 has been described as an example above, the present disclosure is not limited to this example. The height of the partition plate 23 may be equal to the height of the end portion 111 and the end portion 411, or may be higher than the height of the end portion 111 and the end portion 411. In this case, the creepage distance between the high-voltage terminal 11 (end portion 111) and the low-voltage terminal 41 (end portion 411) can be further increased, and the insulating properties are further improved.

In addition, although the case where the height of the partition wall 24 is approximately equal to the height of the remaining portion of the high-voltage terminal 11 and the remaining portion of the low-voltage terminal 41 has been described as an example above, the present disclosure is not limited to this example. The height of the partition wall 24 may be higher than the height of the remaining portion of the high-voltage terminal 11 and the remaining portion of the low-voltage terminal 41. In this case, the creepage distance between the high-voltage terminal 11 (remaining portion) and the low-voltage terminal 41 (remaining portion) can be further increased, and the insulating properties are further improved.

Embodiment 2

Figure 4:
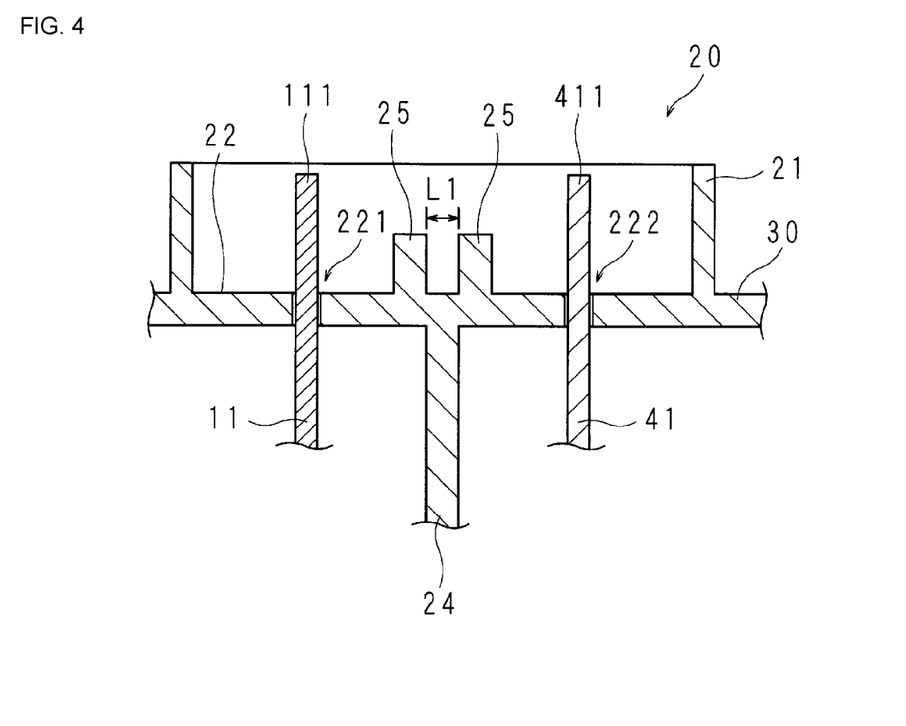
FIG. 4 is a partial cross-sectional view illustrating the configuration of a connection portion of an electrical junction box according to Embodiment 2.

FIG. 4 is a partial cross-sectional view illustrating the configuration of a connection portion 20 of an electrical junction box 100 according to Embodiment 2.

As in the case of Embodiment 1, the electrical junction box 100 of Embodiment 2 also includes a connection portion 20. In the connection portion 20, through holes 221 and 222 are formed in a bottom 22 of an engagement portion 21, one end portion 111 of a high-voltage terminal 11 is exposed to the outside via the through hole 221, and one end portion 411 of a low-voltage terminal 41 is exposed to the outside via the through hole 222.

Two partition plates 25 are provided extending upright from one surface of the bottom 22 of the engagement portion 21, at positions between the end portion 111 of the high-voltage terminal 11 and the end portion 411 of the low-voltage terminal 41. The partition plates 25 have a rectangular plate-like shape and are integrally formed with a housing 50. The two partition plates 25 have an insulating properties, extend in a direction that crosses a direction in which the end portion 111 and the end portion 411 oppose each other, and obstruct the space between the end portion 111 and the end portion 411. The distance L1 between the partition plates 25 is wider than 1 mm and is, for example, 3 mm or less. The height of the partition plates 25 is lower than the height of the end portion 111 and the end portion 411.

A partition wall 24 is provided protruding from a surface of the bottom 22 that is opposite to the above-described one surface of the bottom 22, at a position corresponding to a position between the two partition plates 25. The partition wall 24 has insulating properties and is integrally formed with the housing 50.

In the electrical junction box 100 of Embodiment 2, as described above, the high-voltage terminal 11 and the low-voltage terminal 41 are arranged spaced apart from each other, and the two partition plates 25 and the partition wall 24 are provided between the high-voltage terminal 11 and the low-voltage terminal 41 and obstruct the space between the high-voltage terminal 11 and the low-voltage terminal 41.

Thus, a sufficient air clearance and a sufficient creepage distance can be created between the high-voltage terminal 11 and the low-voltage terminal 41, and insulation between the high-voltage terminal 11 and the low-voltage terminal 41 can be achieved. In particular, since the two partition plates 25 are provided between the high-voltage terminal 11 and the low-voltage terminal 41 while being spaced apart from each other by a distance wider than 1 mm, the creepage distance between the high-voltage terminal 11 and the low-voltage terminal 41 is significantly increased. Accordingly, the high-voltage terminal 11 and the low-voltage terminal 41 can be more reliably insulated from each other.

As a result of being configured as described above, the electrical junction box 100 of Embodiment 2 enables a single connection portion 20 to have both a high-voltage terminal 11 and a low-voltage terminal 41. Thus, the configuration of the electrical junction box 100 can be simplified, and the electrical junction box 100 can be made compact.

Although the case where the two partition plates 25 are provided between the end portion 111 of the high-voltage terminal 11 and the end portion 411 of the low-voltage terminal 41 has been described as an example above, the present disclosure is not limited to this example. Three or more partition plates 25 may be provided.

In addition, although the case where the height of the partition plates 25 is lower than the height of the end portion 111 of the high-voltage terminal 11 and the end portion 411 of the low-voltage terminal 41 has been described as an example above, the present disclosure is not limited to this example. The height of the partition plates 25 may be equal to the height of the end portion 111 and the end portion 411, or may be higher than the height of the end portion 111 and the end portion 411. In this case, the creepage distance between the high-voltage terminal 11 (end portion 111) and the low-voltage terminal 41 (end portion 411) can be further increased, and the insulating properties are further improved.

Components that are the same as those of Embodiment 1 are denoted by the same reference numerals, and their detailed descriptions are omitted.

Embodiment 3

Figure 5:
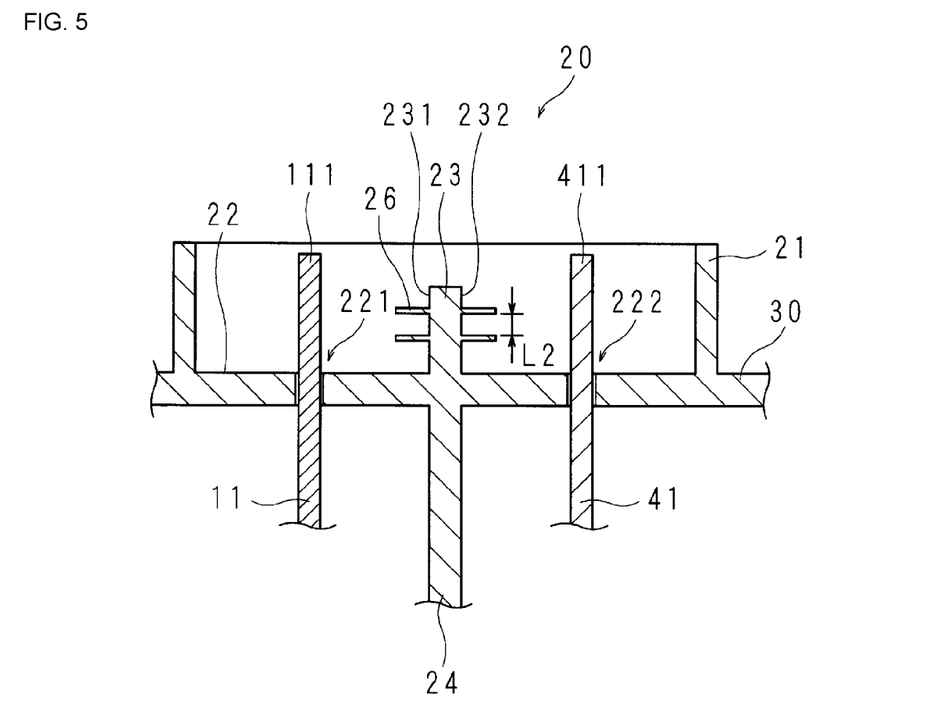
FIG. 5 is a partial cross-sectional view illustrating the configuration of a connection portion of an electrical junction box according to Embodiment 3.

FIG. 5 is a partial cross-sectional view illustrating the configuration of a connection portion 20 of an electrical junction box 100 according to Embodiment 3.

As in the case of Embodiment 1, the electrical junction box 100 of Embodiment 3 also includes a connection portion 20. In the connection portion 20, through holes 221 and 222 are formed in a bottom 22 of an engagement portion 21, an end portion 111 of a high-voltage terminal 11 is exposed to the outside via the through hole 221, and an end portion 411 of a low-voltage terminal 41 is exposed to the outside via the through hole 222.

A partition plate 23 having a rectangular plate-like shape is provided extending upright from one surface of the bottom 22 of the engagement portion 21, at a position between the end portion 111 of the high-voltage terminal 11 and the end portion 411 of the low-voltage terminal 41. The partition plate 23 has insulating properties and is integrally formed with a housing 50. The partition plate 23 extends in a direction that crosses a direction in which the end portion 111 and the end portion 411 oppose each other and obstructs the space between the end portion 111 and the end portion 411. The height of the partition plate 23 is slightly lower than the height of the end portion 111 and the end portion 411.

A pair of fins 26 protrude from one main surface 231 (opposing surface) of the partition plate 23 that opposes the end portion 111, and a pair of fins 26 protrude from another main surface 232 (opposing surface) of the partition plate 23 that opposes the end portion 411. The fins 26 of each pair are parallel to each other, and extend in the crossing direction while being parallel to the above-described one surface of the bottom 22. The length in the crossing direction (longitudinal direction) of each fin 26 is equal to that of the partition plate 23. In addition, the distance L2 between the fins 26 is wider than 1 mm and is, for example, 3 mm or less.

A partition wall 24 is provided protruding from a surface of the bottom 22 that is opposite to the above-described one surface of the bottom 22, at a position corresponding to the partition plate 23. For example, the fins 26, the partition plate 23, and the partition wall 24 are integrally formed with the housing 50.

In the electrical junction box 100 of Embodiment 3, as described above, the high-voltage terminal 11 and the low-voltage terminal 41 are arranged spaced apart from each other, and the partition plate 23 and the partition wall 24 are provided between the high-voltage terminal 11 and the low-voltage terminal 41 and obstruct the space between the high-voltage terminal 11 and the low-voltage terminal 41. Furthermore, a pair of fins 26 are provided on each of the main surfaces 231 and 232 of the partition plate 23.

Thus, a sufficient air clearance and a sufficient creepage distance can be created between the high-voltage terminal 11 and the low-voltage terminal 41, and insulation between the high-voltage terminal 11 and the low-voltage terminal 41 can be achieved. In particular, since the pair of fins 26 on each of the main surfaces 231 and 232 of the partition plate 23 are provided while being spaced apart from each other by a distance wider than 1 mm, the creepage distance between the high-voltage terminal 11 and the low-voltage terminal 41 is significantly increased. Accordingly, the high-voltage terminal 11 and the low-voltage terminal 41 can be more reliably insulated from each other.

As a result of being configured as described above, the electrical junction box 100 of Embodiment 3 enables a single connection portion 20 to have both a high-voltage terminal 11 and a low-voltage terminal 41. Thus, the configuration of the electrical junction box 100 can be simplified, and the electrical junction box 100 can be made compact.

Although the case where a pair of fins 26 are provided on each of the main surfaces 231 and 232 of the partition plate 23 has been described as an example above, the present disclosure is not limited to this example. The number of fins 26 may be one, or three or more.

In addition, although the case where the fins 26 are provided on both of the main surfaces 231 and 232 of the partition plate 23 has been described as an example above, the present disclosure is not limited to this example. A fin 26 may be provided on only one of the main surfaces 231 and 232.

In addition, although the case where the creepage distance is increased by providing the fins 26 on the main surfaces 231 and 232 of the partition plate 23 has been described as an example above, the present disclosure is not limited to this example. The creepage distance may be increased by forming a recess in each of the main surfaces 231 and 232 of the partition plate 23.

Components that are the same as those of Embodiment 1 are denoted by the same reference numerals, and their detailed descriptions are omitted.

Embodiment 4

Figure 6:
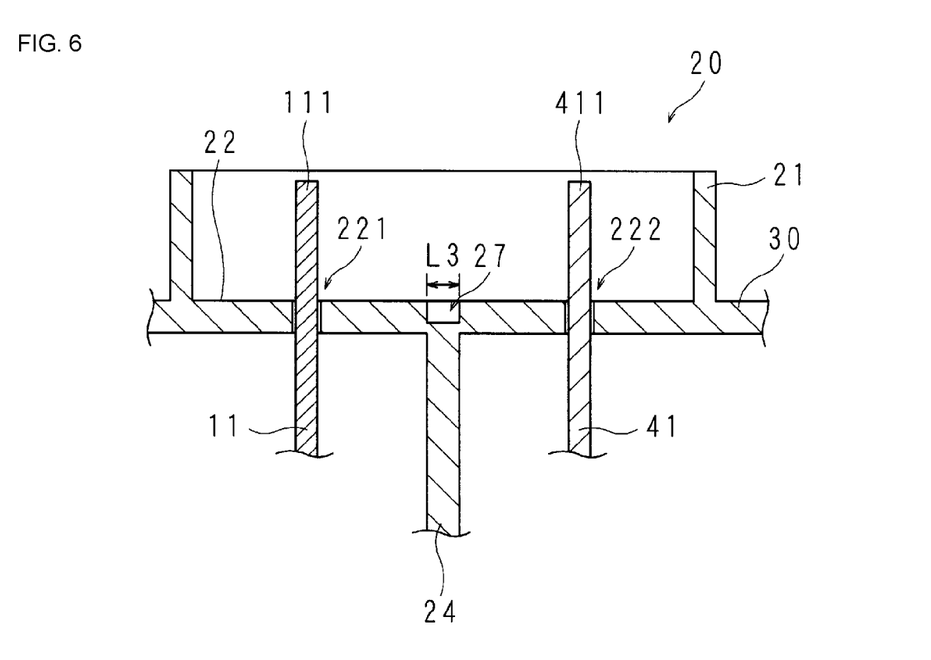
FIG. 6 is a partial cross-sectional view illustrating the configuration of a connection portion of an electrical junction box according to Embodiment 4.

FIG. 6 is a partial cross-sectional view illustrating the configuration of a connection portion 20 of an electrical junction box 100 according to Embodiment 4.

As in the case of Embodiment 1, the electrical junction box 100 of Embodiment 4 also includes a connection portion 20. In the connection portion 20, through holes 221 and 222 are formed in a bottom 22 of an engagement portion 21, one end portion 111 of a high-voltage terminal 11 is exposed to the outside via the through hole 221, and one end portion 411 of a low-voltage terminal 41 is exposed to the outside via the through hole 222.

A groove portion 27 is provided in one surface of the bottom 22 of the engagement portion 21, at a position between the end portion 111 of the high-voltage terminal 11 and the end portion 411 of the low-voltage terminal 41. The groove portion 27 extends in a direction that crosses a direction in which the end portion 111 and the end portion 411 oppose each other. The width L3 of the groove portion 27 is wider than 1 mm and is, for example, 3 mm or less.

A partition wall 24 is provided protruding from a surface of the bottom 22 that is opposite to the above-described one surface of the bottom 22, at a position corresponding to the groove portion 27. For example, the partition wall 24 is integrally formed with the housing 50.

In the electrical junction box 100 of Embodiment 4, as described above, the high-voltage terminal 11 and the low-voltage terminal 41 are arranged spaced apart from each other, and the groove portion 27 is formed between the high-voltage terminal 11 and the low-voltage terminal 41.

Thus, a sufficient air clearance and a sufficient creepage distance can be created between the high-voltage terminal 11 and the low-voltage terminal 41, and insulation between the high-voltage terminal 11 and the low-voltage terminal 41 can be achieved. In particular, since the groove portion 27 is formed between the high-voltage terminal 11 and the low-voltage terminal 41, the creepage distance between the high-voltage terminal 11 and the low-voltage terminal 41 is significantly increased. Accordingly, the high-voltage terminal 11 and the low-voltage terminal 41 can be more reliably insulated from each other.

As a result of being configured as described above, the electrical junction box 100 of Embodiment 4 enables a single connection portion 20 to have both a high-voltage terminal 11 and a low-voltage terminal 41. Thus, the configuration of the electrical junction box 100 can be simplified, and the electrical junction box 100 can be made compact.

Although the case where a single groove portion 27 is formed between the end portion 111 of the high-voltage terminal 11 and the end portion 411 of the low-voltage terminal 41 has been described as an example above, the present disclosure is not limited to this example. Two or more groove portions 27 may be provided.

Components that are the same as those of Embodiment 1 are denoted by the same reference numerals, and their detailed descriptions are omitted.

Figure 7:
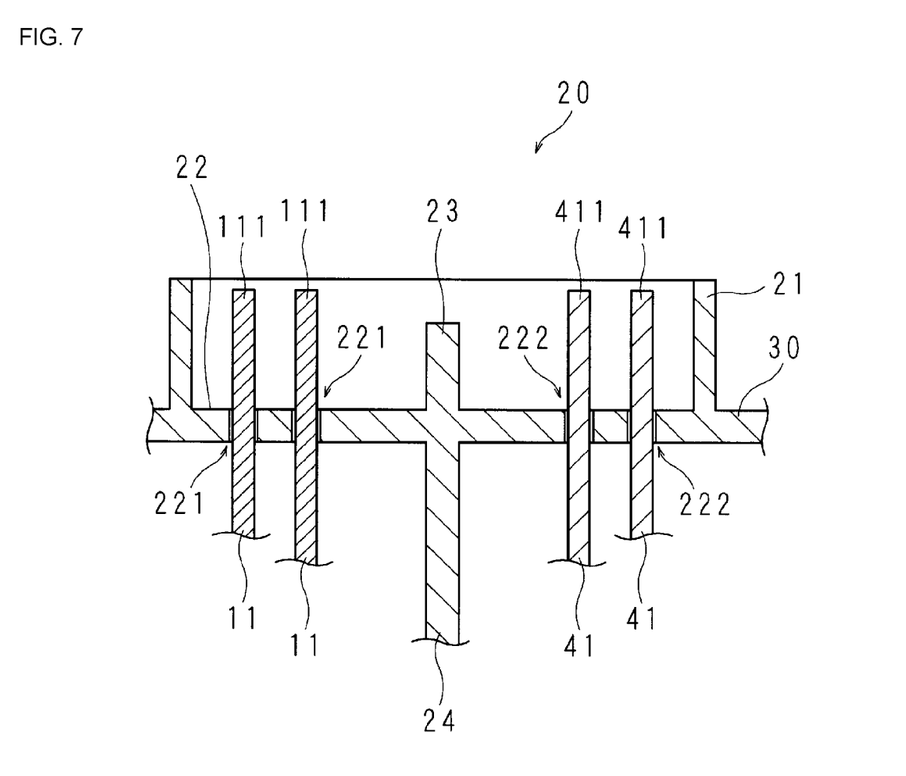
FIG. 7 is a partial cross-sectional view showing a variation of Embodiment 1.

FIG. 7 is a partial cross-sectional view showing a variation of Embodiment 1.

In Embodiment 1 described above, the connection portion 20 has a single high-voltage terminal 11 and a single low-voltage terminal 41, and the creepage distance between the high-voltage terminal 11 and the low-voltage terminal 41 is significantly increased by the partition plate 23 and the partition wall 24 that are formed between the high-voltage terminal 11 and the low-voltage terminal 41. However, the present disclosure is not limited to this configuration. The connection portion 20 may have a plurality of high-voltage terminals 11 and a plurality of low-voltage terminals 41.

For example, a configuration may also be adopted in which two through holes 221 and two through holes 222 are formed in the bottom 22 of the connection portion 20 (engagement portion 21), two high-voltage terminals 11 extend from the inside of the housing 50 to the outside through the respective through holes 221, and two low-voltage terminals 41 extend from the inside of the housing 50 to the outside through the respective through holes 222. As shown in FIG. 7, a partition plate 23 and a partition wall 24 are formed between the two high-voltage terminals 11 and the two low-voltage terminals 41. The two low-voltage terminals 41 and the two high-voltage terminals 11 are arranged side-by-side in the direction in which the terminals oppose the partition plate 23 (partition wall 24), or in other words, the thickness direction of the partition plate 23 (partition wall 24). The partition plate 23 and the partition wall 24 have already been described, and their detailed descriptions are omitted.

Although the case where the two low-voltage terminals 41 are arranged side-by-side, and the two high-voltage terminals 11 are arranged side-by-side, in the thickness direction of the partition plate 23 (partition wall 24) has been described as an example above, the present disclosure is not limited to this example. A configuration may also be adopted in which two low-voltage terminals 41 are arranged side-by-side, and two high-voltage terminals 11 are arranged side-by-side, in a direction that crosses the thickness direction of the partition plate 23 (partition wall 24).

In addition, although the case where the partition plate 23 (partition wall 24) is formed between the two high-voltage terminals 11 and the two low-voltage terminals 41 has been described as an example above, the present disclosure is not limited to this example. A partition plate 23 (partition wall 24) may be formed between the high-voltage terminals 11 and between the low-voltage terminals 41.

Figure 8:
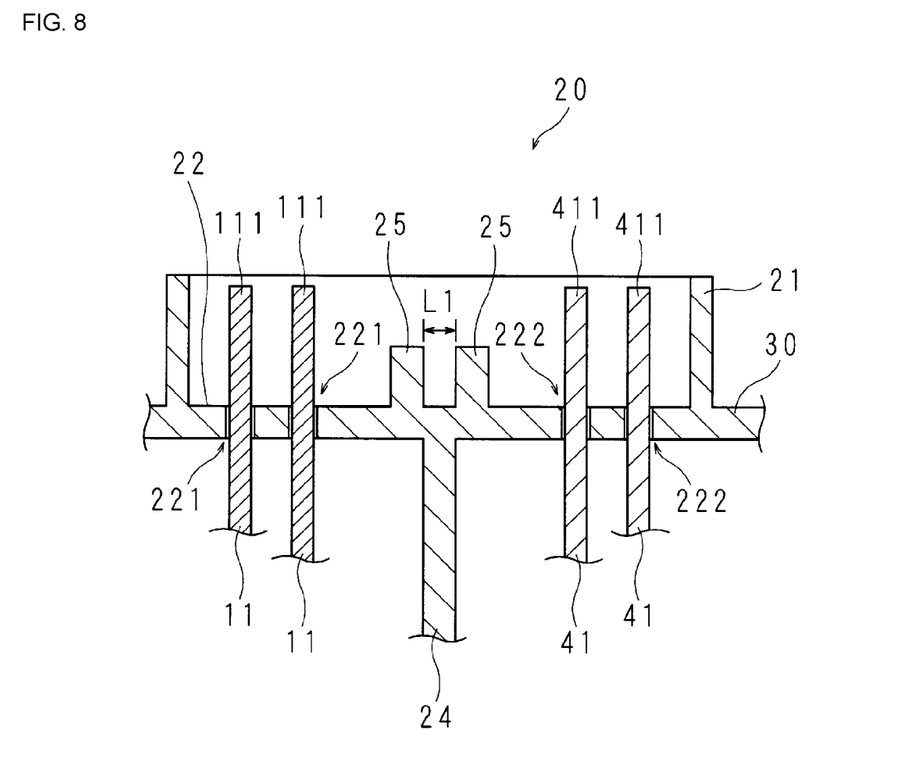
FIG. 8 is a partial cross-sectional view showing a variation of Embodiment 2.

FIG. 8 is a partial cross-sectional view showing a variation of Embodiment 2.

In Embodiment 2 described above, the connection portion 20 has a single high-voltage terminal 11 and a single low-voltage terminal 41, and the creepage distance between the high-voltage terminal 11 and the low-voltage terminal 41 is significantly increased by two partition plates 25 that are provided extending upright between the single high-voltage terminal and the single low-voltage terminal 41 and a single partition wall 24 that is formed between the single high-voltage terminal 11 and the single low-voltage terminal 41.

However, the present disclosure is not limited to this configuration. The connection portion 20 may have a plurality of high-voltage terminals 11 and a plurality of low-voltage terminals 41.

For example, a configuration may also be adopted in which two through holes 221 and two through holes 222 are formed in the bottom 22 of the connection portion 20 (engagement portion 21), two high-voltage terminals 11 extend from the inside of the housing 50 to the outside through the respective through holes 221, and two low-voltage terminals 41 extend from the inside of the housing 50 to the outside through the respective through holes 222. As shown in FIG. 8, two partition plates are provided extending upright between the two high-voltage terminals 11 and the two low-voltage terminals 41, and a single partition wall 24 is formed between the two high-voltage terminals 11 and the two low-voltage terminals 41. The two low-voltage terminals 41 and the two high-voltage terminals 11 are arranged side-by-side in a direction in which the partition plates 25 oppose each other, or in other words, the thickness direction of the partition plates 25 (partition wall 24). The partition plates 25 and the partition wall 24 have already been described, and their detailed descriptions are omitted.

Although the case where the two low-voltage terminals 41 are arranged side-by-side, and the two high-voltage terminals 11 are arranged side-by-side, in the thickness direction of the partition wall 24 has been described as an example above, the present disclosure is not limited to this example. A configuration may also be adopted in which two low-voltage terminals 41 are arranged side-by-side, and two high-voltage terminals 11 are arranged side-by-side, in a direction that crosses the thickness direction of the partition wall 24.

In addition, although the case where two partition plates 25 are provided extending upright between the two high-voltage terminals 11 and the two low-voltage terminals 41, and a single partition wall 24 is formed between the two high-voltage terminals 11 and the two low-voltage terminals 41 has been described as an example above, the present disclosure is not limited to this example. A configuration may also be adopted in which two partition plates 25 are also provided extending upright between the high-voltage terminals 11 and between the low-voltage terminals 41, and a single partition wall 24 is also formed between the high-voltage terminals 11 and between the low-voltage terminals 41.

Figure 9:
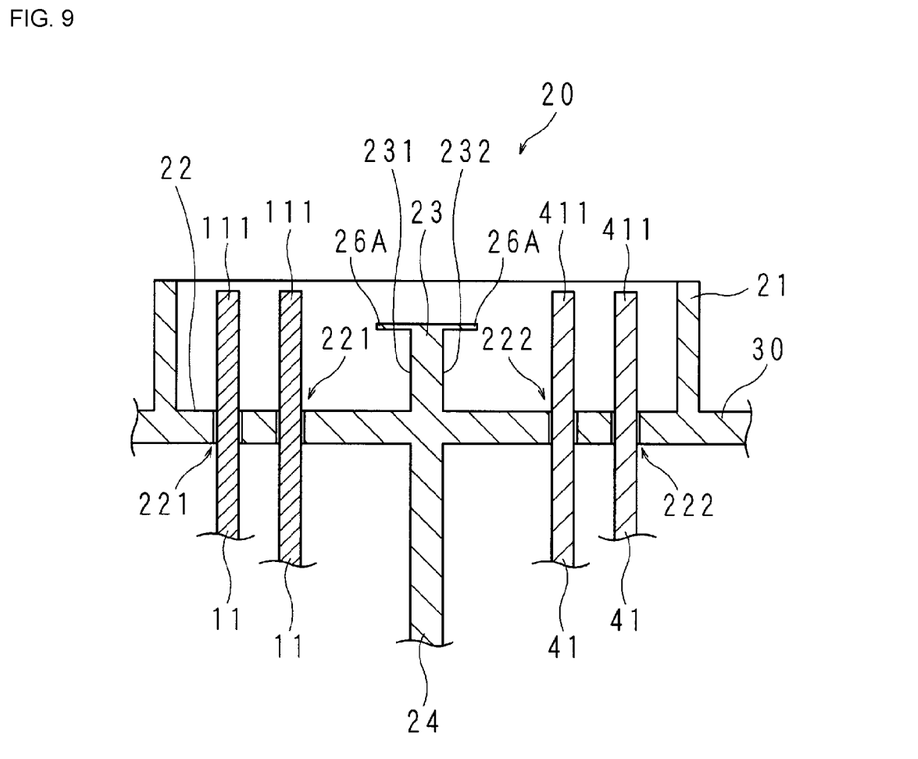
FIG. 9 is a partial cross-sectional view showing a variation of Embodiment 3.

FIG. 9 is a partial cross-sectional view showing a variation of Embodiment 3.

In Embodiment 3 described above, the connection portion 20 has a single high-voltage terminal 11 and a single low-voltage terminal 41, and the creepage distance between the high-voltage terminal 11 and the low-voltage terminal 41 is significantly increased by the partition plate 23 and the partition wall 24 that are provided between the high-voltage terminal 11 and the low-voltage terminal 41. However, the present disclosure is not limited to this configuration. The connection portion 20 may have a plurality of high-voltage terminals 11 and a plurality of low-voltage terminals 41.

For example, a configuration may also be adopted in which two through holes 221 and two through holes 222 are formed in the bottom 22 of the connection portion 20 (engagement portion 21), two high-voltage terminals 11 extend from the inside of the housing 50 to the outside through the respective through holes 221, and two low-voltage terminals 41 extend from the inside of the housing 50 to the outside through the respective through holes 222. As shown in FIG. 9, a partition plate 23 and a partition wall 24 are formed between the two high-voltage terminals 11 and the two low-voltage terminals 41. The two low-voltage terminals 41 and the two high-voltage terminals 11 are arranged side-by-side in the direction in which the terminals oppose the partition plate 23 (partition wall 24), or in other words, the thickness direction of the partition plate 23 (partition wall 24).

The partition plate 23 has insulating properties and is integrally formed with the housing 50. As described above, the partition plate 23 has a rectangular plate-like shape, and obstructs the space between the end portions 111 of the two high-voltage terminals 11 and the end portions 411 of the two low-voltage terminals 41. The partition plate 23 and the partition wall 24 have already been described, and their detailed descriptions are omitted.

At a distal end portion of the partition plate 23, a fin 26A protrudes from each of a main surface 231 (opposing surface) of the partition plate 23 that opposes the end portion 111 and another main surface 232 (opposing surface) of the partition plate 23 that opposes the end portion 411. The fins 26A each extend in the crossing direction while being parallel to the above-described one surface of the bottom 22. The length in the crossing direction (longitudinal direction) of each fin 26A is equal to that of the partition plate 23.

Although the case where the two low-voltage terminals 41 are arranged side-by-side, and the two high-voltage terminals 11 are arranged side-by-side, in the thickness direction of the partition plate 23 (partition wall 24) has been described as an example above, the present disclosure is not limited to this example. A configuration may also be adopted in which two low-voltage terminals 41 are arranged side-by-side, and two high-voltage terminals 11 are arranged side-by-side, in a direction that crosses the thickness direction of the partition plate 23 (partition wall 24).

In addition, although the case where the partition plate 23 (partition wall 24) is formed between the two high-voltage terminals 11 and the two low-voltage terminals 41 has been described as an example above, the present disclosure is not limited to this example. A partition plate 23 (partition wall 24) may be formed between the high-voltage terminals 11 and between the low-voltage terminals 41.

Figure 10:
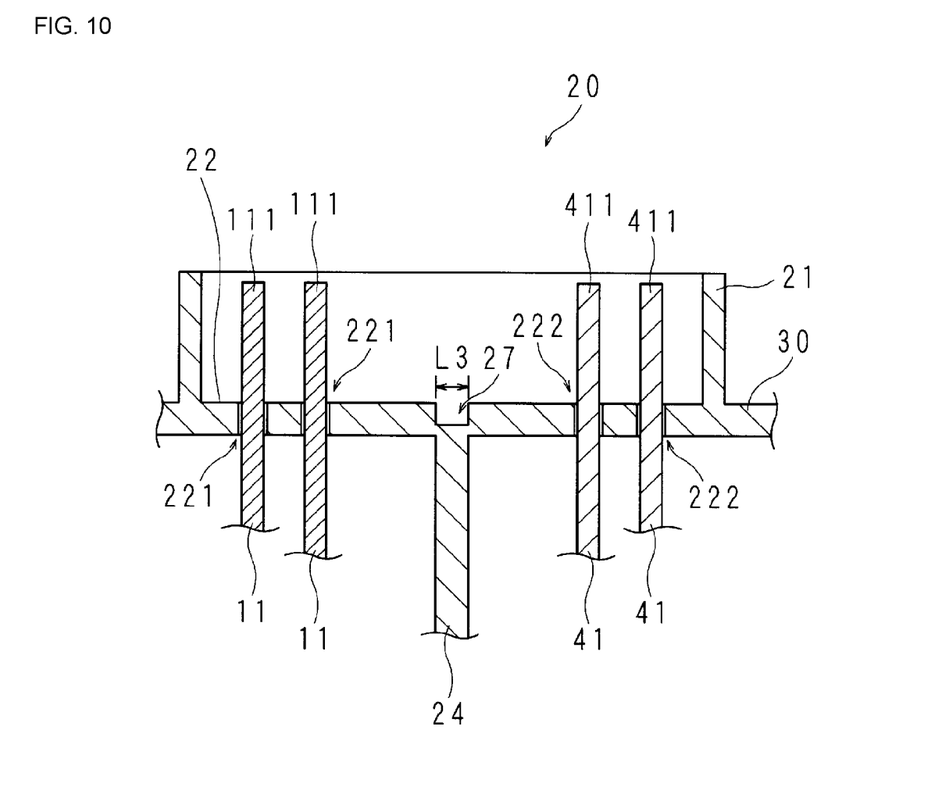
FIG. 10 is a partial cross-sectional view showing a variation of Embodiment 4.

FIG. 10 is a partial cross-sectional view showing a variation of Embodiment 4.

In Embodiment 4 described above, the connection portion 20 has a single high-voltage terminal 11 and a single low-voltage terminal 41, and the creepage distance between the high-voltage terminal 11 and the low-voltage terminal 41 is significantly increased by the groove portion 27 and the partition wall 24 that are formed between the single high-voltage terminal 11 and the single low-voltage terminal 41. However, the present disclosure is not limited to this configuration. The connection portion 20 may have a plurality of high-voltage terminals 11 and a plurality of low-voltage terminals 41.

For example, a configuration may also be adopted in which two through holes 221 and two through holes 222 are formed in the bottom 22 of the connection portion 20 (engagement portion 21), two high-voltage terminals 11 extend from the inside of the housing 50 to the outside through the respective through holes 221, and two low-voltage terminals 41 extend from the inside of the housing 50 to the outside through the respective through holes 222. As shown in FIG. 10, a groove portion 27 and a partition wall 24 are formed between the two high-voltage terminals 11 and the two low-voltage terminals 41. The two low-voltage terminals 41 and the two high-voltage terminals 11 are arranged side-by-side in a width direction of the groove portion 27, or the thickness direction of the partition wall 24. The groove portion 27 and the partition wall 24 have already been described, and their detailed descriptions are omitted.

Although the case where the two low-voltage terminals 41 are arranged side-by-side, and the two high-voltage terminals 11 are arranged side-by-side, in the width direction of the groove portion 27, or the thickness direction of the partition wall 24 has been described as an example above, the present disclosure is not limited to this example. A configuration may also be adopted in which two low-voltage terminals 41 are arranged side-by-side, and two high-voltage terminals 11 are arranged side-by-side, in a direction that crosses the width direction of the groove portion 27 or the thickness direction of the partition wall 24.

In addition, although the case where the groove portion 27 (partition wall 24) is formed between the two high-voltage terminals 11 and the two low-voltage terminals 41 has been described as an example above, the present disclosure is not limited to this example. A groove portion 27 (partition wall 24) may be formed between the high-voltage terminals 11 and between the low-voltage terminals 41.

The technical features (constituent elements) described in Embodiments 1 to 4 may be combined with one another, and new technical features can be formed by combining them.

The embodiments disclosed herein should be considered in all respects as illustrative and not restrictive. The scope of the present disclosure is defined by the claims, not by the meaning given in the foregoing description, and all modifications that come within the meaning and range of equivalency of the claims are intended to be embraced therein.

The invention claimed is:

1. An electrical junction box for a vehicle, comprising a housing that accommodates a high-voltage circuit for high voltages and a low-voltage circuit for low voltages,
the electrical junction box comprising:
a connection portion for connection to an external device, the connection portion being provided on the housing,
wherein the connection portion has a recessed engagement portion that is engageable with the external device,
an end portion of a high-voltage terminal connected to the high-voltage circuit and an end portion of a low-voltage terminal connected to the low-voltage circuit are exposed to an outside via through holes formed in a bottom of the engagement portion, and
a partition plate having a first surface opposite of a second surface that is disposed in a space between the end portion of the high-voltage terminal and the end portion of the low-voltage terminal is provided extending upright from the bottom, wherein the first surface is entirely spaced apart from the high-voltage terminal and the second surface is entirely spaced apart from the low-voltage terminal.

2. The electrical junction box according to claim 1, wherein a plurality of the partition plates are provided, and a distance between the plurality of partition plates is 1 mm or more.

3. The electrical junction box according to claim 1, wherein a fin is provided protruding from a surface of the partition plate that opposes the end portion of the high-voltage terminal or the end portion of the low-voltage terminal, and extends parallel to the bottom.

4. The electrical junction box according to claim 3, wherein a plurality of the fins are provided, and a distance between the plurality of fins is 1 mm or more.

5. The electrical junction box according to claim 1, wherein the connection portion has a recessed engagement portion that is engageable with the external device,
an end portion of the high-voltage terminal and an end portion of the low-voltage terminal are exposed to an outside via through holes formed in a bottom of the engagement portion, and
a groove having a width of 1 mm or more is provided in the bottom, at a position between the end portion of the high-voltage terminal and the end portion of the low-voltage terminal.

6. The electrical junction box according to claim 2, wherein a fin is provided protruding from a surface of the partition plate that opposes the end portion of the high-voltage terminal or the end portion of the low-voltage terminal, and extends parallel to the bottom.

* * * * *